United States Patent [19]

Higuchi et al.

[11] Patent Number: 4,484,824
[45] Date of Patent: Nov. 27, 1984

[54] SEALED NON-SEPARABLE COMBINED BEARING

[75] Inventors: Seiji Higuchi, Fujisawa; Moichi Chiba, Yokosuka, both of Japan

[73] Assignee: Nippon Seiko Kabushiki Kaisha, Tokyo, Japan

[21] Appl. No.: 521,122

[22] Filed: Aug. 8, 1983

[30] Foreign Application Priority Data

Aug. 9, 1982 [JP] Japan ............................ 57-119959[U]

[51] Int. Cl.³ .............................................. F16C 21/00
[52] U.S. Cl. ..................................... 384/126; 384/482
[58] Field of Search ................ 384/126, 130; 308/231, 308/187.1, 234, 227

[56] References Cited

U.S. PATENT DOCUMENTS

| 1,992,065 | 2/1935 | Grainger | 384/126 |
| 3,058,786 | 10/1962 | Banerian | 384/126 |
| 3,380,790 | 4/1968 | Osmond | 308/234 |
| 4,427,089 | 1/1984 | Peterson | 384/126 |

Primary Examiner—Lenard A. Footland
Attorney, Agent, or Firm—Basile, Weintraub & Hanlon

[57] ABSTRACT

A combined bearing having both a radial bearing and a thrust bearing which is applicable to the strut-type suspension of an automotive vehicle. The combined bearing includes a bearing race member having a sealing capacity which is coupled to an opposing bearing race member by using an engaging lip and a coupling lip. Both lips are provided on a radial bearing member. The outside configuration of the assembled sealed combined bearing is compact. In addition the construction, handling and assembly are very simple.

4 Claims, 4 Drawing Figures

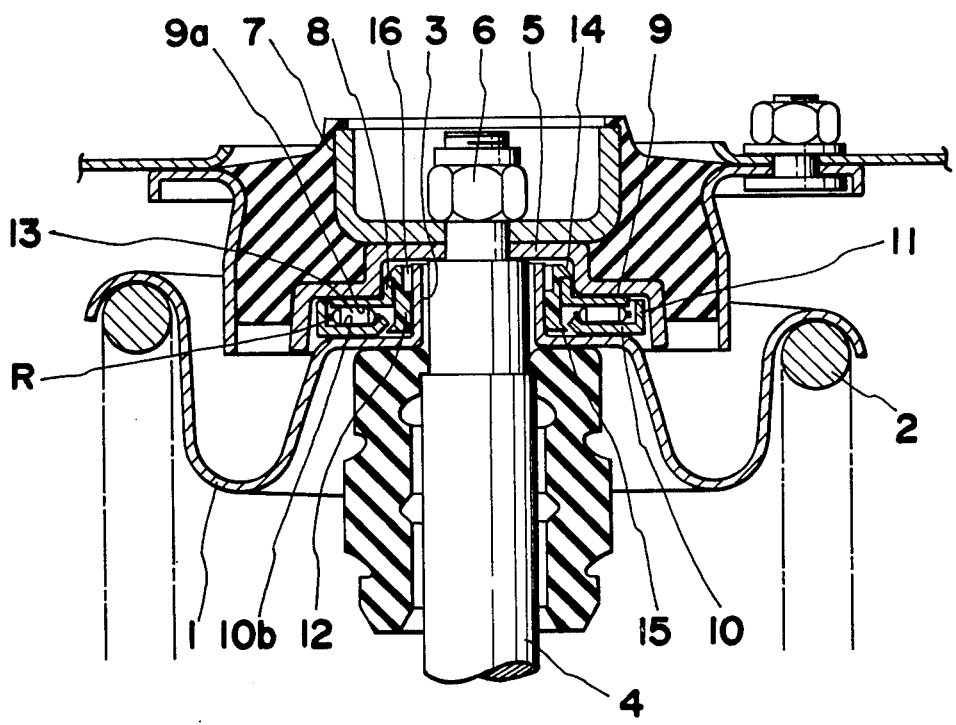
FIG. 1
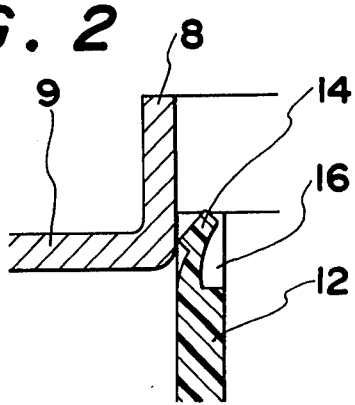
FIG. 2
FIG. 4
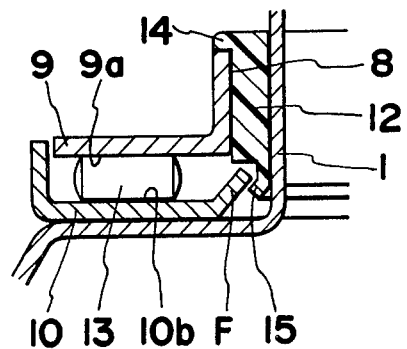
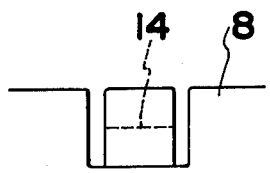
FIG. 3

SEALED NON-SEPARABLE COMBINED BEARING

BACKGROUND OF THE INVENTION

1. Field Of The Invention

This invention relates to a sealed, non-separable combined bearing. More particularly, the invention concerns a bearing which can function as a combined radial and thrust bearing applicable to a strut-type suspension for automotive vehicles, wherein a bearing race member having a sealing function is coupled, by means of a radial bearing member, to the other bearing race member. In addition, the bearing of this invention has a compact outside configuration.

2. Description Of The Prior Art

Heretofore, there have been typically two types of bearings particularly used for MacPherson Strut-type suspension. One of them uses both a radial bearing and a thrust bearing independently, while in the other one, as shown by British Patent Laid-Open Specification No. 2055155A, a radial bearing member is interposed between a cylindrical portion formed axially on the inner periphery of one bearing race member and a cylindrical portion formed on the inner periphery of the other bearing race member. Thus, in the latter case the two bearing race members are coupled by the radial bearing member.

However, in the former case, the component parts relating to bearing construction become large in number accompanying larger space for mounting and increased weight. In the latter case, additional sealing members are required to impart sealing capability which, in turn, has brought about additional assembly steps and more complicated construction.

The most similar prior art known to the inventor of the present invention is the British Laid-Open Patent Publication. However, the non-separable combined bearing disclosed by the Laid-Open Publication differs from the present invention with respect to the point that its sealing means is not supported by the radial bearing member. Accordingly, the construction of the bearing of this type requires additional parts for sealing, which brings about the drawbacks of additional assembly steps and complicated construction.

On the other hand, it is required for a bearing used in strut-type suspension to be simple in construction, strong and light weight. The present invention aims to solve the aforesaid problems.

OBJECTS OF THE INVENTION

An object of the present invention is to provide a sealed, non-separable combined bearing. Another object of the present invention is to provide a sealed, non-separable combined bearing which is simple in construction, assembly and in handling.

A still further object of the present invention is to provide a sealed, non-separable combined bearing which is compact in size; not bulky; and suitable for mounting.

SUMMARY OF THE INVENTION

The bearing of the present invention comprises: (a) a first bearing race member, (b) a second bearing race member opposing the first bearing race member, (c) an axial cylindrical sealing member formed on either one of the bearing race members by radially bending the outer peripheral rim thereof, (d) a set of bearing rollers disposed radially inside the sealing member to define a thrust bearing, (e) a radial bearing member joined thereto to define a combined bearing, and wherein the radial bearing member plays a role for assembling both bearing race member and the sealing member.

In other words, the radial inner rim of one bearing race member is bent to form an axially extending cylindrical portion, while the radial inner rim of the other bearing race member constitutes a coupling flange. More specifically, the radial inner periphery of the other bearing race member is angularly bent to form a conical cylinder to, thus, provide a tapered flange. Meanwhile, the radial outer periphery of the same bearing race member is bent to define an axially extending sealing member.

The cylindrical radial bearing member, having an engaging lip on the outer upper periphery and a coupling lip directed radially outwardly, is fabricated of synthetic resinous material.

When the radial bearing member is inserted into the cylindrical portion of the one bearing race member, with its engaging lip to be engaged with the uppermost end of the cylindrical portion, and the coupling lip at the lower portion with the lower face of the coupling flange, the bearing race members, as well as the sealing member, can be assembled concurrently.

With respect to the engaging lip and the coupling lip two embodiments can be optionally used in assembling one bearing race member to the other bearing race member. Either only the engaging lip elastically deforms or only the coupling lip elastically deforms.

According to the present invention, the first bearing race member, the second bearing race member and the sealing member can be assembled readily as a complete unit of a sealed non-separable combined bearing, concurrent with the final assembly step of the radial bearing member. Yet, the thus formed combined bearing is compact in size, simple in both construction and in handling and is very strong.

For a more complete understanding of the present invention reference is made to the following detailed description and accompanying drawing. In the drawing like reference characters refer to like parts throughout the several views, in which:

BRIEF DESCRIPTION OF THE DRAWINGS

FIG. 1 is a vertical, cross-sectional view of a MacPherson Strut-type front suspension;

FIG. 2 is an enlarged, sectional view showing the main part of a cylindrical portion and a radial bearing member of the present invention;

FIG. 3 is a rear view of the engaging lip of the radial bearing member, and

FIG. 4 is a partial, enlarged view of a second embodiment of the present invention.

DETAILED DESCRIPTION OF THE PREFERRED EMBODIMENTS

Referring now to the drawing, as noted, FIG. 1 shows a cross-section of a MacPherson strut-type front suspension. Since the construction of this suspension is well known it will not be explained in detail, but only the construction of a sealed non-separable combined bearing according to the present invention will be detailed.

According to the present invention a shoulder seat member 1 is supported at its outer radial end by a coil spring 2 of the front suspension. A housing portion 3, in the form of an axially upstanding cylinder, provided at the center of the front suspension, is formed and attached around the upper end of the piston rod 4 of the suspension. A bell housing 5 is supported around the shouldered uppermost end of the piston rod 4 and is fixed thereto by a nut 6 and a cap member 7.

The bell housing member 5 is disposed in opposing relationship to and spaced apart from the shoulder seat member 1. The non-separable, combined bearing of the present invention is interposed therebetween.

The non-separable combined bearing hereof comprises a bearing race member 9, having its radial inner periphery extending axially upward to define a cylindrical portion 8. The bearing hereof further comprises a second bearing race member 10 which confronts the first race member; a sealing member 11 formed by bending the outer periphery of the second bearing race member 10 axially upward; a tapered coupling flange F formed by bending the inner periphery of the second bearing race member 10 angularly upward to form an annular cone; a cylindrical radial bearing member 12 disposed in and extending over the inner peripheries of both of the bearing race members 9, 10; and a number of needle roller bearings 13 interposed between the race members 9, 10. The assembly hereof also includes a retainer R.

The radial bearing member 12 has an outside diameter which just fits the inside surface of the cylindrical portion 8. The member 12 further includes, on the outer periphery of its top end, an engaging lip 14 projecting radially outward. A coupling lip 15 is formed on the bottom end of the member 12. The lip 15 projects radially annularly outward. As shown in FIG. 3, the lip 14 is formed of partially cutting away the upper part of the radial bearing member 12. Additionally, the radial inner part of the engaging lip 14 is formed with a recess 16 reaching to the top face, as shown in FIGS. 1 and 2.

Although not shown in the drawing the engaging lip 14 can comprise a plurality of such lips. Associated with each such lip 14 is a recess 16.

Similarly, the other or second bearing race member 10 comprises a seal member 11. The seal member 11 is formed by bending the radial outer periphery of the member 10 upward. A tapered coupling flange F is formed by bending the radial inner periphery of the member 10 angularly axially to thereby form an annular cone.

The tapered coupling flange F is formed such that its inner diameter is smaller than that of the cylindrical portion 8.

In addition, each of the bearing race members 9, 10 has a bearing race face 9a and 10b, respectively. The needle rollers 13 are disposed between the race faces when arrayed and assembled. In this manner, the sealing member 11 seals the radial outer end face of each needle roller 13.

After having faced the two members 9 and 10 and assembled them, the radial bearing member 12 is inserted, from the bottom, along the inner face of the cylindrical portion 8 of the bearing race member 10.

At this time, the bearing is depressed by the inner face of the cylindrical portion 8 of the bearing race member 10, as shown in FIG. 2. This elastic deformation is facilitated by the recess 16. Upon further insertion of the engaging lip 14, up to the position shown in FIG. 1, the lip portion reverts to its original shape, by its resiliency and engages the upper end face of the cylindrical portion 8 of the bearing race member 9. Thus, the radial bearing member 12 is supported by the bearing race member 9. At the same time, the coupling lip 15, at the lower end of the radial bearing member 12, abuts the lower reverse face of the tapered coupling flange F of the second bearing race member 10 and supports it against downward movement. In this way, the sealing member 11 and the second bearing race member 10 are coupled to the bearing race member 9 so as to be assembled as a non-separable combined bearing. Since a bearing of this kind can be incorporated, as a single piece, into a strut-type front suspension merely by a one touch operation, it is proven to be very ready in handling and is simple and strong in construction.

In FIG. 4 there is shown a second embodiment hereof. In this embodiment, the radial bearing member 12 is inserted downward from the upper end of the cylindridal portion 8. Almost all other parts of the assembly are the same as those disclosed in the first embodiment, so the detailed explanation will be made only on the unique features of this embodiment.

Generally, the bearing of this embodiment differs from that of FIGS. 1 through 3, in that this bearing does not use any cage. Also, the tapered coupling flange F of this embodiment has its inner diameter smaller than that of the cylindrical portion 8. Likewise, the coupling lip 15, at the lower end of the radial bearing member 12, if formed by annularly cutting away the outer periphery of the lower end portion of the radial bearing member 12 and its lowermost end is bent radially and outwardly. In assembly, the radial bearing member 12 is forcibly inserted downward from the upper end of the cylindrical member 12 so as to abut the engaging lip 14 to the upper end face of the cylindrical portion 8. Then the coupling lip 15, at first, will abut the tapered flange F of the second bearing race member 10. Then, the lip 15 resiliently deforms and passes over the coupling flange F. Thus the coupling flange F of the second bearing member 10 enters into the recessed portion, so that the coupling lip 15 can support the tapered coupling flange F at its reverse face.

In this way, both the bearing race members 9 and 10 are assembled together into a sealed non-separable combined bearing.

Having, thus, described the invention what is claimed is:

1. A sealed, non-separable bearing, comprising:
  (a) a first bearing race member having a race surface, the race member having an axially upstanding cylindrical portion formed at its radial inner periphery;
  (b) a second bearing race member having a race surface opposed to the race surface of the first race member, the second race member including a coupling flange formed at the radial inner periphery thereof and being contiguous therewith;
  (c) a set of bearing rollers disposed between the race surfaces for receiving a thrust load;
  (d) a cyilndrical radial bearing member fitted within the cylindrical portion of the first race member, the bearing member including an annular engaging lip formed at an upper end thereof, and a coupling lip at a lower end thereof, the coupling lip having an outside diameter greater than the inside diameter of the coupling flange to permit the lip to extend up to the lower face of the coupling flange, and
  (e) an axial sealing member formed on the outer periphery of one of the race members, the sealing member being defined by a bent portion of the outer periphery of one of the race members, the sealing member covering the radial outer side of the bearing rollers.

2. A sealed non-separable combined bearing as claimed in claim 1, wherein said coupling flange comprises an annular tapered flange angularly upstanding from the periphery of the second bearing race member.

3. A sealed non-separable combined bearing as claimed in claim 1, wherein the radial bearing member is deformable to enable the fitting of said radial bearing member with the cylindrical portion, and wherein extension of the coupling lip up to the lower face of the coupling flange is performed by the elastic deformation of either the coupling lip or the engaging lip of the radial bearing member.

4. A sealed non-separable combined bearing as claimed in claim 1, wherein the engaging lip of the radial bearing member comprises a plurality of lips disposed on the upper end of the radial bearing member and a plurality of recesses associated therewith, the lips being elastically deformable.

* * * * *